Oct. 1, 1935.  P. H. QUACKENBUSH  2,016,050

NUT CRACKER AND METHOD OF MAKING THE SAME

Filed March 29, 1933

Inventor
Paul H. Quackenbush

By
Dodge and Sons
Attorneys.

Patented Oct. 1, 1935

2,016,050

UNITED STATES PATENT OFFICE 2,016,050

NUT CRACKER AND METHOD OF MAKING THE SAME

Paul H. Quackenbush, Herkimer, N. Y., assignor, by mesne assignments, to H. M. Quackenbush, Inc., Herkimer, N. Y., a corporation of New York Application March 29, 1933, Serial No. 663,413

3 Claims. (Cl. 76—101)

My invention relates to nut crackers, and particularly to nut crackers of the hand operated type. More particularly the invention relates to a simple and efficient method of making nut crackers.

Nut crackers of the prior art have, for the most part, been constructed of heavy material which required not only extensive and time-consuming grinding and polishing operations before being plated or finished, but it was necessary, in forming the device, that it be subjected to a plurality of machining operations. Where nut crackers are constructed of material such as cast-iron, the surface is extremely rough and must be polished and buffed before it is satisfactory for sale. Likewise, cast-iron is difficult to drill, as well as being heavy and cumbersome in proportion to its strength.

If a nut cracker of simple construction is to be produced, it must be attractive in appearance and the manufacturing operations must be reduced to a minimum in order to permit the device to be sold at a low price without lowering the quality of the product.

Accordingly, one object of my invention is to produce a nut cracker frame economically from drawn stock sufficiently smooth and bright of surface that all grinding and polishing (necessary on a cast metal frame) is substantially eliminated.

A further object of the invention is to produce from hot or cold drawn steel stock, a nut cracker frame that largely needs only to be shaped and requires far less machining operations in its manufacture than one made of cast material.

Other objects of the invention will appear from the following description when read in connection with the accompanying drawing, in which:—

Figure 1:
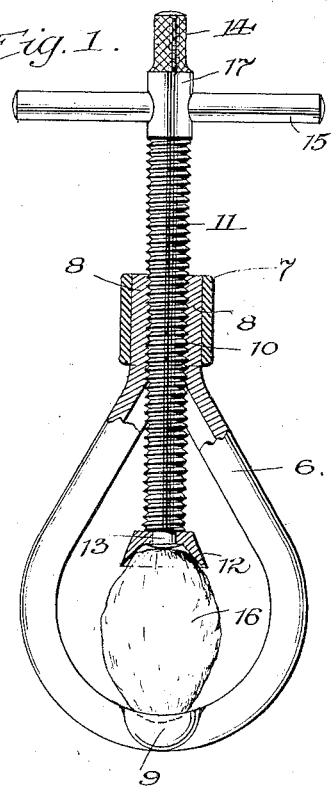
Figure 1 is a view, partly in elevation and partly in section, showing one form of nut cracker embodying my invention, with a nut in position for cracking.
Figure 4:
Fig. 4 is a view showing the nut cracker frame in an intermediate state of formation.

In Figure 1 of the drawing, the reference character 6 designates a frame member made up of a section of hot or cold drawn channel steel stock, the two ends 8 of which abut each other to form a substantially circular opening, and are held in place by a ferrule or collar 7. The section 6 is punched out at 9 to form a stationary anvil which is integral with the frame and is adapted to receive and support a nut 16 to be cracked. Deformation of the channel section to provide lateral extensions forming the stationary anvil 9 10 causes the nut being cracked to be held securely against slippage at the lower end. This makes the action of the cracker more positive and simpler than it could be without the extensions being provided, and besides, simplifies the manufacture, since a single operation in a punch press will suffice to bend the ends 8 downwardly, as shown in Fig. 4, and to form the anvil 9. While this anvil is shown in the drawing as being formed integrally with the section 6, it may be a separate member attached to this section. While the channel stock itself may be used as an anvil without being punched, the structure shown is more effective and practical.

The neck formed by the abutting ends 8 of section 6 is internally threaded at 10 to receive a threaded rod 11, which may be moved back and forth through the opening in the neck, to bring an anvil 12 pivotally connected to the rod at 13 into engagement with a nut to be cracked. Passing through the rod 11 at 17 is a transverse pin 15, secured in place either rigidly or loosely and serving as a lever and handle for reciprocating anvil 12 toward and away from anvil 9.

The free end of rod 11 in the vicinity of portion 17 is knurled as at 14, and is of such diameter as to permit it to be spun between the thumb and finger. This construction enables the operator to twirl the rod, to bring the anvil 12 into engagement with the nut quickly and without slow and laborious manipulation of the pin 15.

The process of making nut crackers embodying my invention is simple. It consists essentially in cutting from bar stock the sections 6 in a punch press, and at the same time deforming the stock midway between the ends of the section, to form the stationary anvil 9, and bending down the ends 8, as shown in Fig. 4.

Subsequently, the section is bent to the form shown in Fig. 1, until the ends 8 abut to form the neck and the ferrule 7 is driven into place. The opening through the neck is then of substantially circular cross-section and is threaded internally at 10 to complete the formation of the frame. Thereafter, a rod 11 carrying pin 15 but without anvil 12, is threaded into place through the neck opening and the anvil 12 is riveted in position at 13. This completes the manufacture of the article and makes it ready for sale without machining or polishing operations.

Figure 5:
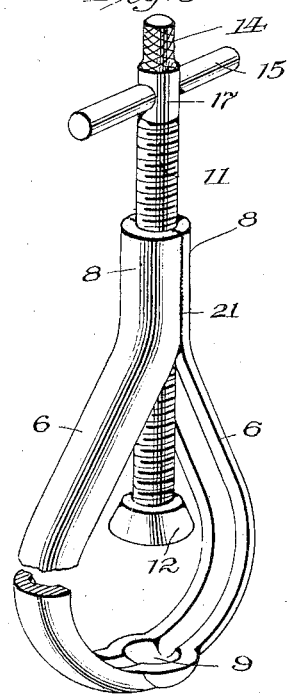
Fig. 5 is a perspective view of a modified form of nut cracker embodying my invention.
Figure 3:
Fig. 3 is a perspective view of a section of drawn channel stock suitable for use in forming frames of nut crackers embodying my invention.
Figure 2:
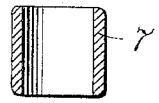
Fig. 2 is a sectional view of one form of ferrule or collar employed for fastening the frame together.

Although in Figure 1 the two ends 8 of the frame section have been shown to be held in place by a ferrule 7, the use of such a ferrule may be avoided by the construction shown in Fig. 5. In this case, the ends 8 are secured together at 21 by welding, soldering or brazing, to complete the neck of the frame. The structure shown in Fig. 5 is otherwise identical with that of Fig. 1.

Figure 6:
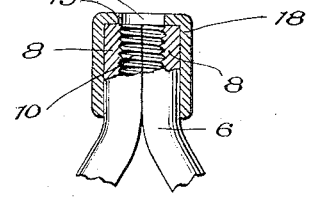
Fig. 6 is a fragmentary view, partly in section, showing a modified type of ferrule applied to a nut cracker frame to secure it together.

In Figure 1, the ferrule or collar 7 is shown to be of straight cylindrical form. When this collar is in position the ends 8 of the channel section 6 are exposed and may be of somewhat irregular contour. Accordingly, in some instances it may be preferable to make use of a ferrule of the type shown in Figure 6, wherein the body of this ferrule 18 carries a flange 19 perforated at 20, in alignment with the threaded opening of the neck, between the ends 8 of the channel section 6. This construction renders it unnecessary to finish the ends of the section 6 and when the ferrule is in place the ends 8 are confined within and covered by the flange 19, thus presenting a smooth finished appearance.

When a nut cracker is made in this way, the bright drawn channel stock has initially a bright surface so that it requires practically no finishing before it is presented for sale. The ends 8 of the section 6 being of U-shaped cross-section, form an opening which does not have to be drilled, and when these ends are secured together, it is only necessary to tap this opening in order to complete the formation of the nut cracker frame.

In the usual constructions of this type, it is furthermore necessary to mill the interior of the frame to form a stationary anvil, but when steel of channel section is employed in this way only simple punching, bending and tapping operations are necessary to produce the frame.

After the rod carrying the movable anvil is put in place, a strong, light and attractive product results and one which offers all the advantages of more expensive constructions and yet can be made for a fraction of their cost.

What is claimed is:

1. The method of making a closed ring-like nut cracker frame which method consists in cutting a section of channel stock to length, bending the end portions of the section out of the plane of the section for subsequent parallel positioning, bending the section to ring-like contour until the end portions are in juxtaposition, securing the end portions together to form a tubular portion, and threading the interior of the tubular portion.

2. The method of making a nut cracker frame of closed ring-like contour, which method consists in cutting a section of channel steel stock to length, bending the end portions of the section out of the plane of the section for subsequent parallel positioning and simultaneously shaping the section to form a nut-receiving cavity, bending the section to bring the end portions into abutting relation, applying a ferrule to the end portion to maintain the relation thereof and form a tubular portion, and threading the interior of the tubular portion.

3. A nut cracker comprising a closed frame made up of a single section of steel stock substantially U-shaped in cross section having its two ends in abutting relation to form a substantially circular opening and having its mid portion deformed to provide an integral nut supporting anvil; a ferrule embracing the ends of said section to hold them in juxtaposition; a reciprocable rod in threaded relation to said circular opening; an anvil pivotally mounted on the end of said rod within the contour of said frame for cooperation with said integral anvil; and actuating means carried by said rod outside of said frame.

PAUL H. QUACKENBUSH.